United States Patent [19]
Yanagawa

[11] 3,942,642
[45] Mar. 9, 1976

[54] CARD RETRIEVAL SYSTEM
[75] Inventor: Nobuyuki Yanagawa, Tokyo, Japan
[73] Assignee: Ricoh Company Ltd., Tokyo, Japan
[22] Filed: Aug. 21, 1974
[21] Appl. No.: 499,237

[30] Foreign Application Priority Data
Oct. 22, 1973 Japan............................ 48-118743

[52] U.S. Cl............................. 209/74 R; 209/80.5
[51] Int. Cl.²..................... B07C 3/18; G06K 21/00
[58] Field of Search.................. 209/74, 80.5, 110.5

[56] References Cited
UNITED STATES PATENTS

| | | | |
|---|---|---|---|
| 3,378,014 | 4/1968 | Schwab.............................. | 209/80.5 |
| 3,610,413 | 10/1971 | Bandenburg....................... | 209/80.5 |
| 3,800,942 | 4/1974 | Hirata et al........................ | 209/80.5 |

Primary Examiner—Robert B. Reeves
Assistant Examiner—Joseph J. Rolla
Attorney, Agent, or Firm—Frank J. Jordan

[57] ABSTRACT

A large number of cards are vertically randomly stored on a horizontal platen. Each card has a serrated bottom code edge contacting the platen, a magnetic chip implanted in a vertical edge and a hook on the upper edge. Selected serrations are removed from the bottom edges of the cards to constitute a selection code. Selected sorting bars are raised into position between the serrations, and a magnet attracts the magnetic chips so that only the selected card having serrations removed corresponding to the raised sorting bars is pulled horizontally backward by the magnet by a distance of one serration. A push bar then engages with the hook of the selected card, and pushes the selected card horizontally forward and simultaneously lifts the selected card clear of the other cards to a retrieval position.

7 Claims, 16 Drawing Figures

CARD RETRIEVAL SYSTEM

The present invention relates to a method and system for selectively retrieving from storage a desired card or sheet of microfiche or the like.

With the increasing usage of rectangular sheets or cards, such as punch cards or microfiche sheets for retrievably storing information in discrete segments, means for storing and selectively retrieving large numbers of cards or sheets is a basic necessity. Selection or retrieval systems for sheets have hereto been limited to small numbers of sheets, and also to sheets of small size. Such prior art systems have also generally been limited to single drawers of sheet storage cabinets. However, it has recently been desired to store information on sheets as large as 280mm × 210mm, and provide as many as 2000 sheets in a single storage unit which would be as large as 1800mm × 400mm × 500mm. Although large, such storage units should be rectangular and easily stackable to provide a large bank of storage units. It is also desirable to make the storage and selection or retrieval means integral, so that it is unnecessary to remove a large number of sheets from the storage means and carry them to the selection means, which might have to be located in a remote area to serve a number of storage means in various locations.

Such a system is described in U.S. Pat. No. 3,478,877 granted to Robert D. Parry, and an improvement thereto in U.S. Pat. No. 3,610,413 granted to Daniel J. Bandenburg. In the basic Parry system, the cards have serrated or toothed bottom edges, and are randomly stored on a horizontal platen with the serrated edges in contact with the platen. Lock notches are also provided on the bottom edges, and various serrations are removed to constitute a selection code. Sorting bars are raised through slots formed in the platen corresponding to the code of the desired card, and the desired card is magnetically pulled away from the other cards by a distance of one serration by means of an elongated magnet and magnetic chips inplanted in vertical edges of the cards. This is possible because the serrations corresponding to the raised sorting bars are removed. Thereafter, a lock bar is raised into the lock notches of the undesired cards to hold the same, and the sorting bars are retracted back into the platen. The magnet is then moved farther to pull the desired card further away from the undesired cards. After use of the card is completed, the card is inserted partially into the deck of unselected cards, and pushed back to its original storage position by the magnet.

A drawback of this system is that the cards tend to become tilted as they are pushed back into the storage position by the magnet, which results in subsequent erroneous selection. This problem is solved to a certain extent by the improvement disclosed by Bandenburg, involving a novel magnet arrangement.

Another problem with the above described system is that since the desired card is separated from the other cards in a horizontal direction only, the distance of separation, and thereby the stroke of the magnet must be quite substantial. Also, the magnet in this prior art system is adapted to move externally from the main unit during the selection process, and is potentially dangerous and subject to breakage. Since provision must be made in the storage area for the external stroke of the magnet, the compactness of this prior art system is less than ideal.

It is therefore an important object of the present invention to provide a method of retrieving a desired card or sheet from storage which overcomes the above described drawbacks of the prior art and in which the desired card is moved in a combined horizontal and vertical direction from a storage position to a retrieval position.

It is another important object of the present invention to provide a system embodying the above described method.

The above and other objects, features and advantages of the present invention will become clear from the following detailed description taken with the accompanying drawings, in which like reference numerals designate like or similar elements throughout the different views, and in which.

Figure 1:
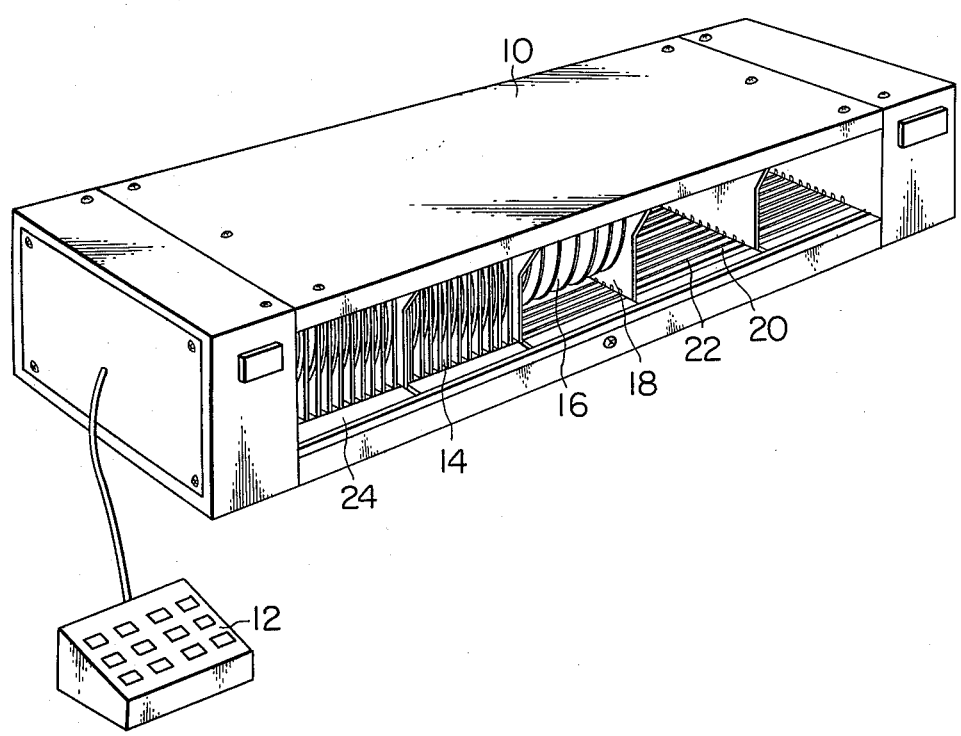
FIG. 1 is a perspective view of a card or sheet retrieval system embodying the present invention.

Referring now to FIG. 1, a card or sheet selection or retrieval system embodying the present invention comprises a main storage unit 10 and a keyboard 12. A large number of sheets or cards 14 are randomly stored in the storage unit 10 in vertical storage positions. The cards 14 may be punched data cards, microfiche sheets, or the like. The storage unit 10 is provided with a partition 16 and a plurality of partition plates 18 which in combination impart high structural rigidity and strength to the storage unit as well as preventing the cards 14 from falling over. The cards 14 are ideally stored in a vertical position, but may tilt slightly without hampering the operation of the system. The cards 14 rest on a horizontal platen 20 formed with horizontal slots 22 therethrough along the entire length of the platen 20 transverse to the bottom edges of the cards 14. A stop plate 24 is also provided to guide the bottom edges of cards 14 being inserted into the storage unit 10, align the front edges (the edges which face outward from the storage unit 10) of the cards 14 and prevent undesired cards 14 from being removed from the storage unit 10 along with desired cards 14 due to friction. The inner edge of the stop plate 24 is higher than the level of the platen 20.

Figure 2A:
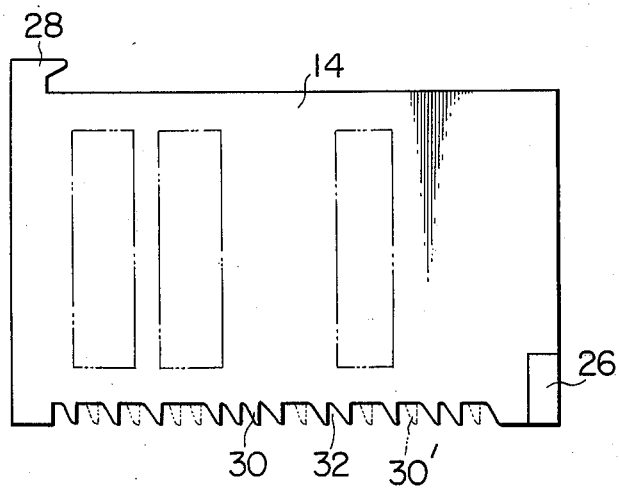
FIGS. 2A and 2B are graphic representations of a card utilized in the system shown in FIG. 1.
Figure 2B:
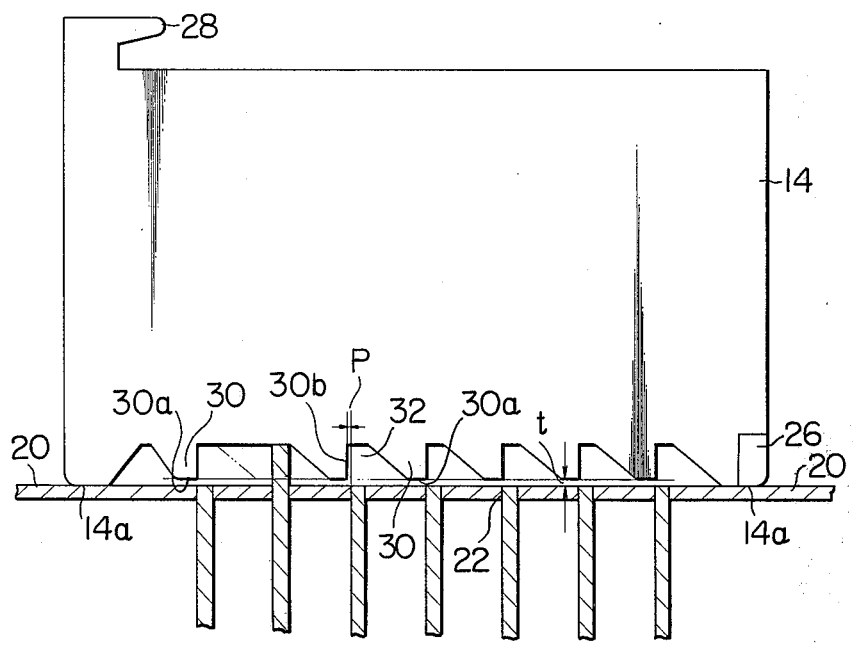

Referring now to FIG. 2, each card 14 is generally rectangular in shape and is formed with a serrated bottom code edge which contacts the platen 20, a magnetically responsive implanted chip 26 provided on the rear vertical edge which faces the interior of the storage unit 10 and an engaging portion or hook 28 on the upper edge near the front vertical edge facing out of the storage unit 10. The bottom edge has serrations of teeth 30, selected teeth being removed to constitute a selection code, such as a tooth 30' shown in broken line. Registration notches 32 are defined between the teeth 30 as shown. If desired, the teeth 30 may have bottom edges 30a formed inwardly of the bottom edge 14a of the card 14 to provide a gap t between the edges of the teeth 30 and the platen 20 as shown in FIG. 2B. Moreover, it may be desired that a gap p be provided between the side edges 30b of the teeth 30 and the side faces of sorting bars as shown in FIG. 2B so that the sorting bars can be readily raisable into the registration notches 32.

The card 14 shown in FIG. 2A has 20 serrations or teeth 30, which are considered as being arranged in groups of five. Each group of five teeth represents one decimal digit, and two teeth 30 of each group of five are removed to designate the corresponding digit. In the system shown, 9,999 cards 14 may be individually disignated. The number of the desired card 14 is entered by means of the keyboard 12, and sorting bars, which will be described in detail below and which correspond to the designation of the desired card, are raised through the slots 22 in the platen 20 into engaging positions in the registration notches 32.

Figure 3:
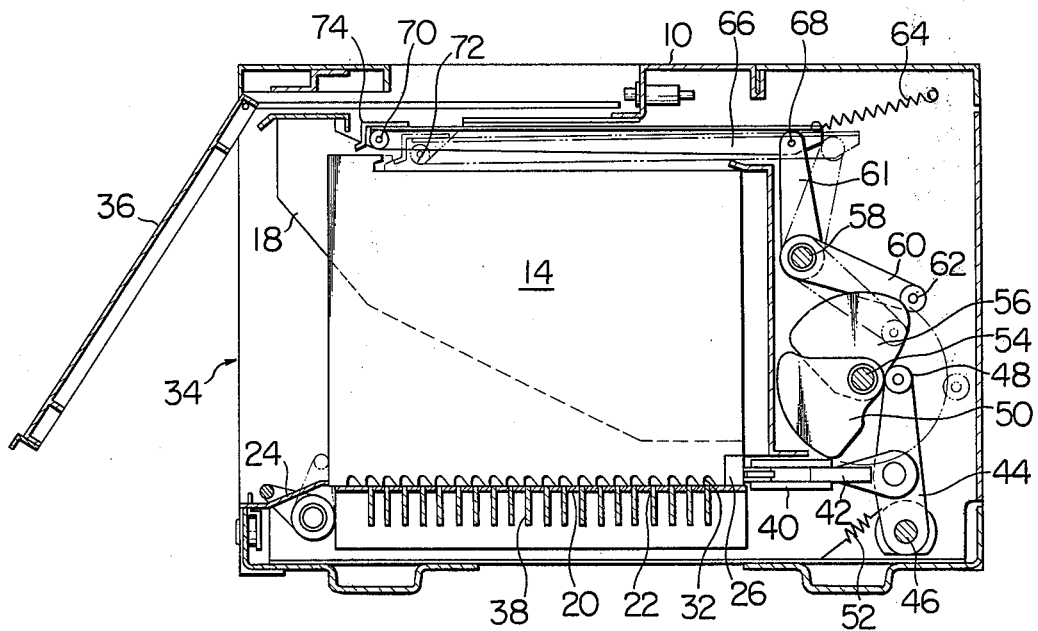
FIG. 3 is a sectional elevation of a main storage unit of the system shown in FIG. 1.

Referring now to FIG. 3, the storage unit 10 defines an access opening 34, through which cards 14 are removed and inserted, and which faces front edges (no numerals) of the cards 14. Movement of a card 14 in the direction out of the storage unit 10 through the access opening 34 is considered as forward movement and vice versa. A lockable door 36 is provided to protect the cards 14 from being stolen or soiled. Sorting bars 38 are vertically raisable into the registration notches 32 of the cards 14 through the slots 22 in the platen 20. An elongated magnet 40 is arranged transverse to the rear edges of the cards 14 adjacent to the magnetic chips 26. The magnet 40 is supported and guided for horizontal movement by a magnet holder 42 which is pivotally connected to an arm 44 which is in turn pivotal about a shaft 46 supported by the frame of the storage unit 10. The end of the arm 44 carries a roller 48 serving as a cam follower, which is biased against the cam surface of a magnet cam 50 by a tension spring 52. The magnet cam 50 is fixed to a clutch shaft 54 which is rotatably supported within the storage unit 10 and also carries a push cam 56. A shaft 58 rotatably supported within the storage unit 10 carries arms 60 and 61, a roller 62 being provided at the end of the arm 60 which contacts the cam surface of the push cam 56 and acts as a cam follower. The arm 61 is biased by a tension spring 64 so that the roller 62 closely follows the cam surface of the push cam 56. The top end of the arm 61 is pivotally connected to an elongated link 66 by a pin 68. The other end of the link 66 carries a roller 70 which rides on the top of a cam surface 72 formed on the plate 18. The other end of the link 66 also carries an engaging member or push bar 74, which is adapted to engage with the hooks 28 of the cards 14 as will be described below. Preferably a plurality of links 66 and plates 18 are provided to accurately guide the push bar 74.

Figure 4:
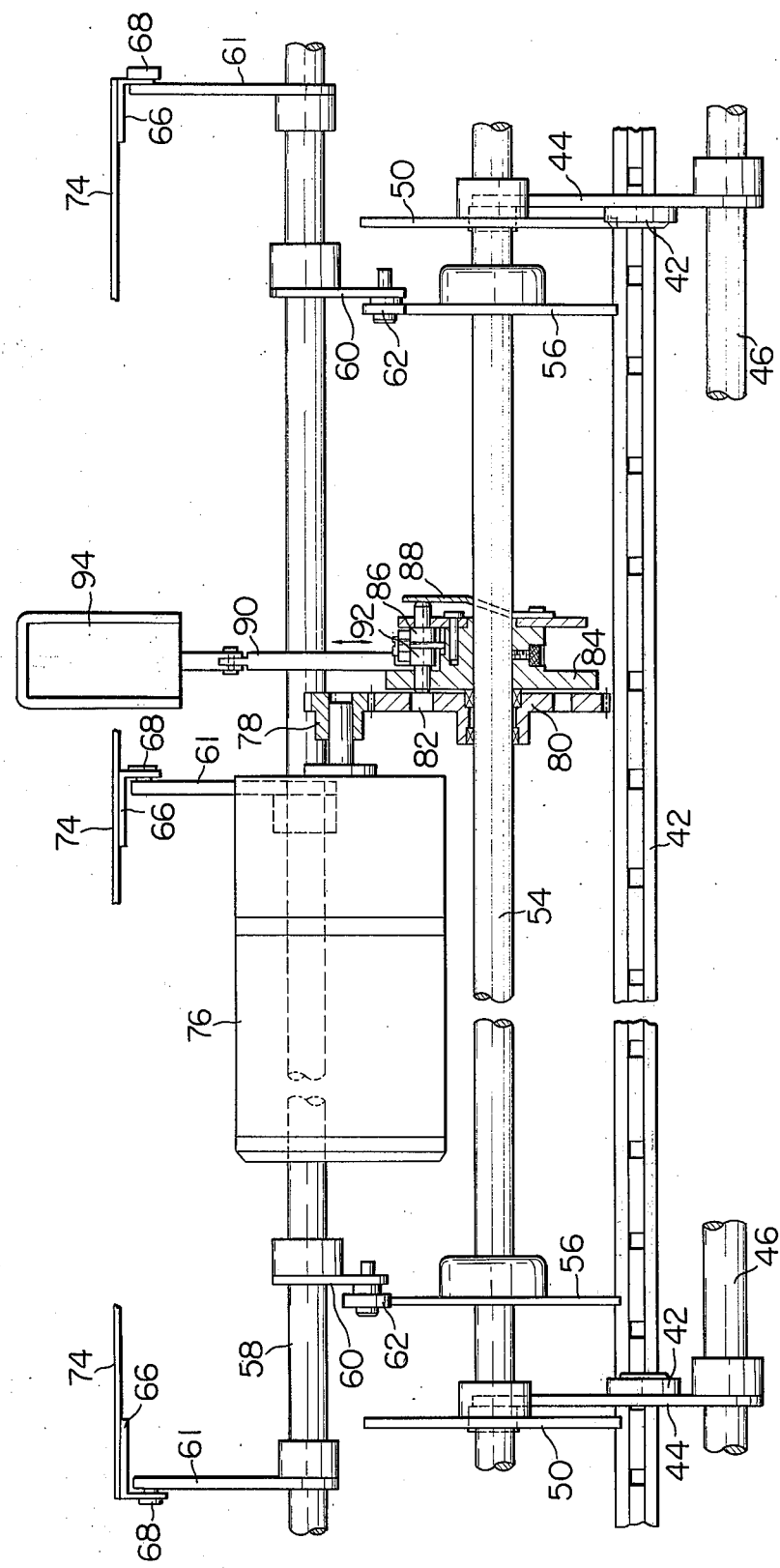
FIG. 4 is a longitudinal sectional view of major components of the main storage unit shown in FIG. 3.

Referring now to FIG. 4, a motor 76 is provided having an output shaft (no numeral) carrying a drive gear 78. A clutch disc 80 is rotatably carried by the clutch shaft 54 and meshes with the drive gear 78. Holes 83 are formed through the clutch disc 80 as will be described below. A clutch drum 84 is fixed to the clutch shaft 54 and has a hole (no numeral) formed therethrough parallel to the clutch shaft 54 through which is slidable a clutch pin 86. The center of the clutch pin 86 is spaced the same distance from the center of the clutch shaft 54 as the center of the holes 82, and is biased to enter one of the holes 82 by a spring 88. A rod 90 of a solenoid 94 is arranged to normally engage with a cam portion 92 of the clutch pin 86 to prevent the clutch pin 86 from entering a hole 82 against the force of the spring 88.

Figure 5:
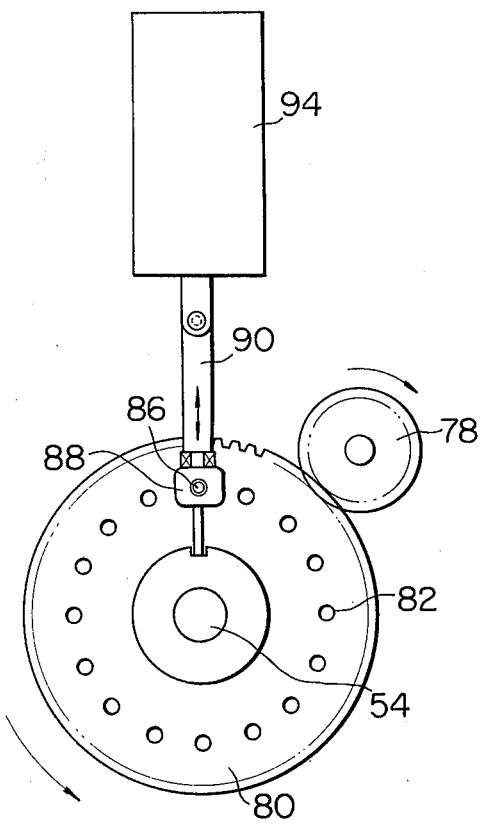
FIG. 5 is a fragmentary sectional elevation showing some of the components shown in FIG. 4.

Referring now to FIG. 5, the holes 82 are shown to be equally circumferentially spaced about the clutch shaft 54. The assembly shown in FIG. 5 acts as a one rotation clutch, and constitutes part of actuating means for the push bar 74 and magnet 40. When the pin 86 aligns with the rod 90 with the solenoid 94 de-energized, the pin 86 will be retracted from the holes 82 and the clutch drum 84 and shaft 54 will not rotate even though the clutch disc 80 is rotated by the motor 76. When the solenoid 94 is actuated, the rod 90 will be retracted from the cam portion 92 of the clutch pin 86 so that the clutch pin 86 will enter one of the holes 82. The clutch drum 84, clutch shaft 54, etc. will then start to rotate along with the clutch disc 80. The solenoid 94 is subsequently de-energized, but the clutch drum 84 will continue to rotate. As the pin 86 again aligns with the rod 90, the cam portion 92 will engage with the rod 90 so that the clutch pin 86 will be retracted from the hole 82. The clutch shaft 54 is thereby rotated by one revolution for each actuation of the solenoid 94.

Figure 6:
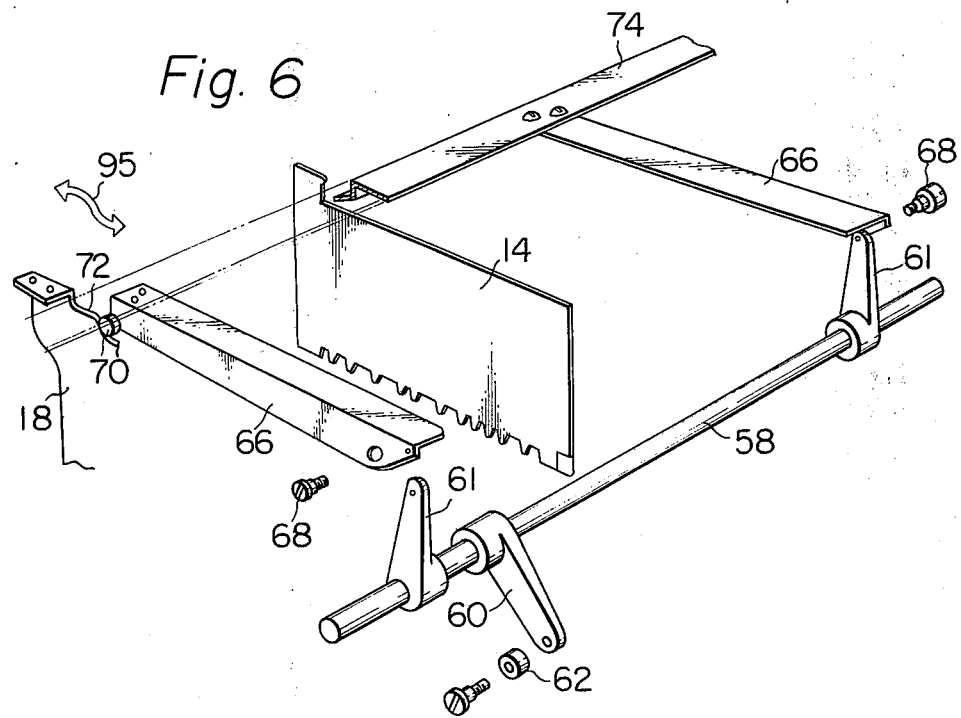
FIG. 6 is a fragmentary exploded view of some of the components shown in FIG. 4.

FIG. 6 is an exploded view of the mechanism to move the push bar 74. Rotation of the shaft 58 will cause the push bar 74 to move in a combined vertical and horizontal direction shown by an arrow 95 as the roller 70 is guided by the cam surface 72 of the plate 18.

Figure 7:
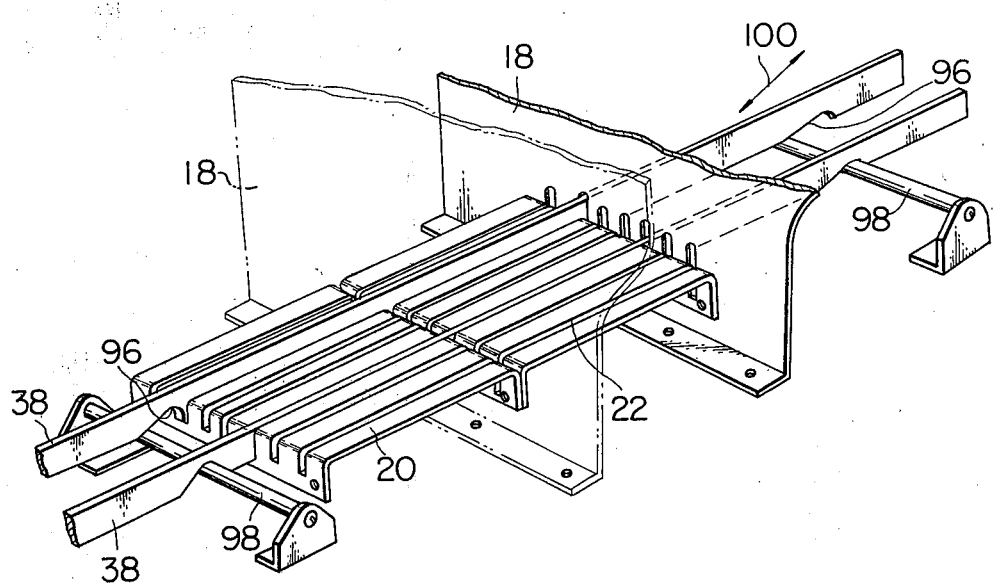
FIG. 7 is a fragmentary plan view of a part of the main storage unit shown in FIG. 3.

FIG. 7 shows the arrangement of two of the sorting bars 38 and the platen 20. The sorting bars 38 are each provided with inclined cam surfaces 96 which ride on control rods 98. When the sorting bars 38 are pulled in the direction of an arrow 100, they will be guided by means of the cam surfaces 96 and control rods 98 to diagonally rise out of the slots 22 of the platen 20 and into engaging positions in the registration notches 32 of the cards 14.

Referring now to FIG. 8, an exemplary selector means or actuating mechanism for one of the sorting bars 38 is clearly shown. A bell crank lever 102 is pivotally connected to the end of the sorting bar 38, and is biased counterclockwise by a tension spring 104. The end of the lower arm of the lever 102 is formed with a cutout 105 adapted to engage with a rod 106 carried at the end of an actuating arm 108. The spring 104 normally biases the lever 102 so that the cutout 105 and rod 106 engage. A bell crank trigger lever 110 is pivotal about an intermediate fixed point. The bottom arm of the trigger lever 110 engages with the upper arm of the lever 102, and the upper arm of the trigger lever 110 is pivotally connected to a rod 112 of a solenoid 114.

Figure 8A:
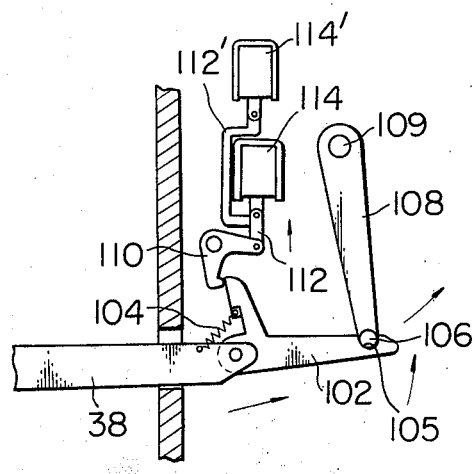
FIGS. 8A and 8B are fragmentary elevations showing part of the main storage unit shown in FIG. 1.

The normal of unactuated state of the mechanism is shown in FIG. 8a, with the sorting bar 38 in a maximum low position substantially flush with the surface of the platen 20 and with the cutout 105 and rod 106 engaged. When it is desired to raise the selected sorting bars 38 in accordance with the code for the selected or desired card 14, the card number (1 to 9,999) is entered into the keyboard 12 which decodes the number and actuates the solenoids 114 for all of the sorting bars 38 except those which are to be raised. The actuating arm 108 is then rotated counterclockwise by means of a drive shaft 109 connected to drive means such as the motor 76.

Figure 8B:
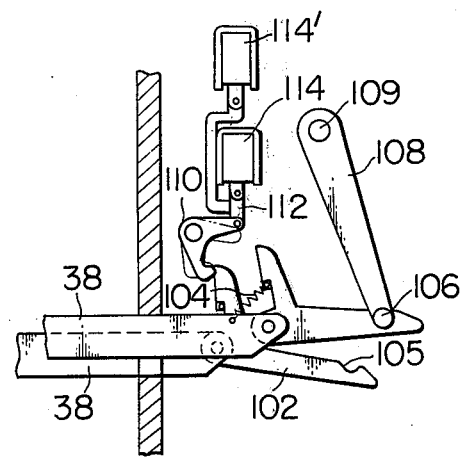

Referring now to FIG. 8b, when the solenoid 114 is not energized and the actuating arm 108 is rotated counterclockwise, the cutout 105 and rod 106 remain engaged and the sorting bar 38 is pulled upward and rightward as viewed in the drawing into position in the corresponding registration notch 32 of the cards 14. If the solenoid 114 is energized, the rod 112 is pulled upward by the solenoid 114 causing the trigger lever 110 to rotate counterclockwise. The bottom arm of the trigger lever 110 then engages with the upper arm of the lever 102 causing the lever 102 to rotate clockwise so that the cutout 105 will disengage from the rod 106. Thus, when the actuating arm 108 is subsequently rotated, the sorting bar 38 will remain unmoved in its normal position and will not engage with the bottom edge of the cards 14. Solenoids 114' and rods 112' for an adjacent sorting bar 38 may be arranged above the solenoid 114 and rod 112 due to space limitations.

Figure 9:
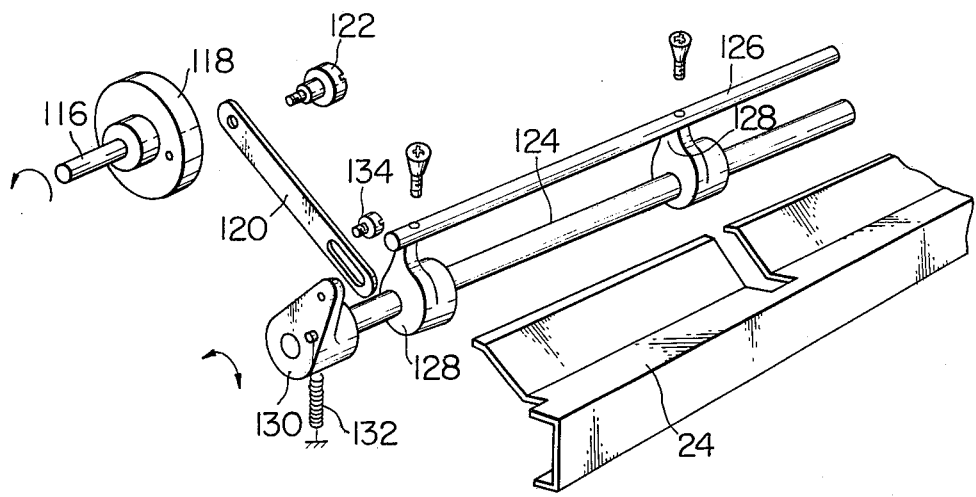
FIG. 9 is an exploded view of part of the main storage unit shown in FIG. 3.

Referring now to FIG. 9, a clutch shaft 116 is connected through a one rotation clutch (not shown), which may be similar to that shown in FIGS. 4 and 5, a drive means such as the motor 76. A bevel gear assembly (not shown) may be provided if required. A disc 118 carried by the clutch shaft 116 is pivotally connected to a link 120 having an elongated slot formed through its other end by means of a pin 122. A shaft 124 is disposed parallel and adjacent to the stop plate 24 and carries an aligning bar 126 by means of arms 128. Another arm 130 carried by the shaft 124 is biased by a tension spring 132 as shown and is pivotally connected at its end to the link 120 by means of a pin 134 extending through the elongated slot of the link 120.

Figure 10:
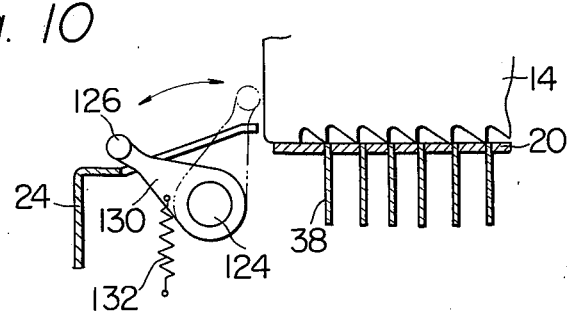
FIG. 10 is a fragmentary elevation of part of the main storage unit shown in FIG. 3.

As shown in FIG. 10, the arm 130 carrying the aligning bar 126 is normally in the position shown in solid line. One rotation of the shaft 116 will cause the arm 130 to rock to the position shown in broken line and back to the normal position. As the aligning bar 126 reaches the position shown in broken line, it will abut against the forward edges of the cards 14 to push the cards 14 rearward to abut against the magnet 40 (see FIG. 3). The cards 14 will thereby be aligned with themselves and with the sorting bars 38. It will be noticed that even if an operator's fingers are caught under the aligning bar 126 on its return stroke, due to the provision of the elongated slot through the link 120 and the spring 132, which actually provides the force to return the arm 130 carrying the aligning bar 126 to the normal position, the operator's fingers will not be hurt since the stiffness of the spring 132 is preferably very low.

The operation of the system will now be described with reference to the drawings, especially FIGS. 11 to 14.

When it is desired to retrieve a selected card 14 from the main storage unit 10, the code number (1 to 9,999) of the card 14 is entered by the operator into the keyboard 12. The keyboard 12 or an associated control unit (not shown) then actuates the storage unit 10.

Figure 11:
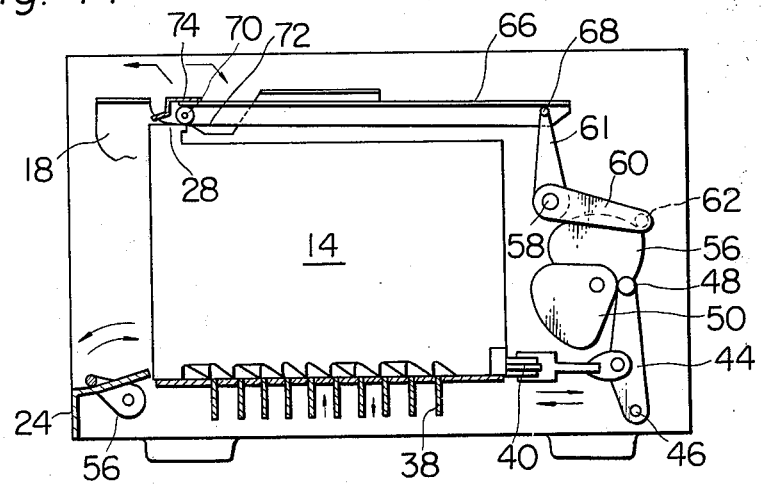
FIG. 11 is similar to FIG. 3, but shows the main storage unit in a storage condition.

FIG. 11 illustrates the normal storage or rest condition of the storage unit 10. The magnet 40 is in a forwardmost position and the push bar 74 is disposed in a forward position above the hooks 28 of the cards 14. The clutch shaft 116 is then rotated by one revolution as indicated by an arrow in FIG. 9 so that the aligning bar 126 is rocked as previously described to push the cards 14 back against the magnet 40 for alignment.

Figure 12:
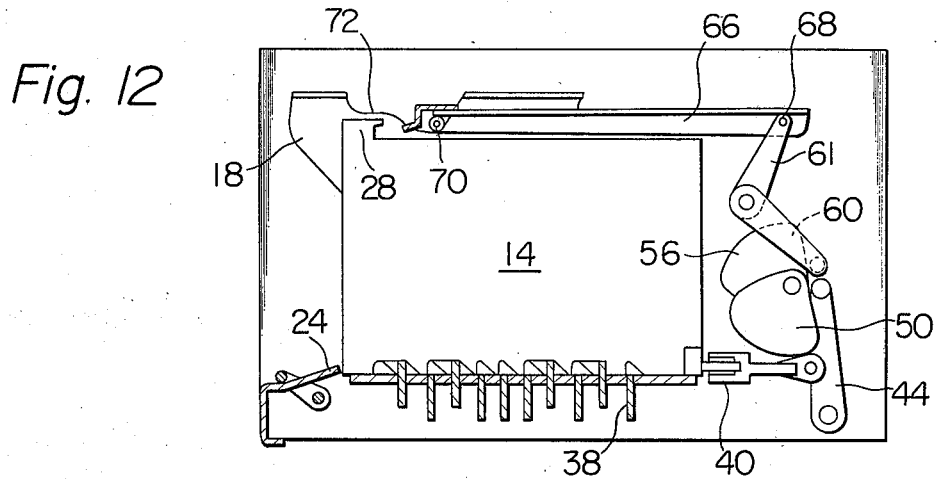
FIG. 12 is similar to FIG. 11, but shows the main storage unit in a primary card selection condition.

Next, the sorting bar mechanism described with reference to FIGS. 7 and 8 is actuated so that the required sorting bars 38 are raised into position in the corresponding registration notches 32 as shown in FIG. 12. The solenoid 94 is then momentarily energized so that the clutch shaft 54 and thereby the magnet and push cams 50 and 56 respectively also rotate counterclockwise as viewed in FIG. 11 through the position shown in FIG. 12 to retract the push bar 74 to the rearward and downward position illustrated. Due to the configuration of the cams 50 and 56, movement of the magnet 40 has not yet begun. It will be noticed that the push bar 74 is disposed directly behind the hooks 28 of the cards 14.

Figure 13:
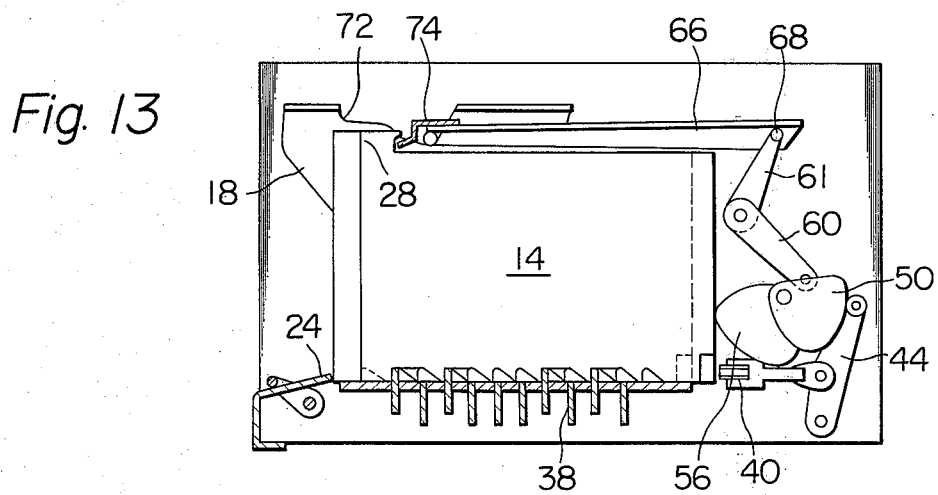
FIG. 13 is similar to FIG. 11, but shows the main storage unit in an intermediate card selection condition.

Subsequent rotation of the clutch shaft 54 causes the magnet 40 to retract to the position shown in FIG. 13 so that the selected card 14 is pulled rearward to an intermediate position. The desired card 14 is moved parallel to its bottom edge by a distance of one serration or tooth 30. The other cards 14 will remain in their normal or storage positions because they are restrained from movement by the sorting bars 38, since only the selected card 14 having teeth 30 removed corresponding to the raised sorting bars 38 will be able to move. It will be noticed in FIG. 13 that rearward movement of the selected card 14 causes the hook 28 of the selected card 14 to engage with the push bar 74.

Figure 14:
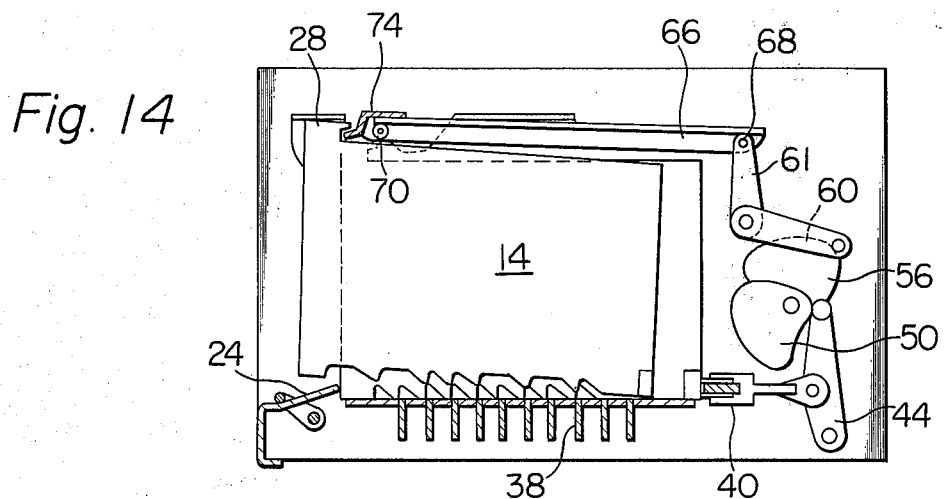
FIG. 14 is similar to FIG. 11, but shows the main storage unit in a final card selection condition.

Further rotation of the cams 50 and 56 will cause push bar 74 to move forward and upward to lift and move the selected card 14 by means of the hook 28 to a retrieval position shown in FIG. 14. During this movement of the push bar 74, the push bar 74 will clear the hooks 28 of the other cards 14 so that only the selected card 14 is moved to the retrieval position. Any undesired cards 14 moved forward by frictional engagement with the selected card 14 will abut at their forward edges against the stop plate 24 and will thereby be prevented from further movement with the selected card 14. Due to the right triangular configuration of the teeth 30, the selected card 14 may easily ride up over the sorting bars 38.

Next, the sorting bars 38 are retracted as shown in FIG. 14, and further rotation of the cams 50 and 56 cause the magnet 40 to move to its rest or storage position shown in FIG. 11. The selected card 14, elevated and held in the retrieval position shown in FIG. 14, may be easily removed from the storage unit 10 through the access opening 34, after use, the selected card 14 is manually inserted back into the storage unit 10 at any random position, and the magnet 40 serves as a stop so that the selected card 14 will be aligned with the rest of the cards 14. To select another card 14, the above described procedure is repeated.

From the above description, it will be appreciated that a card retrieval system of the present invention successfully overcomes the drawbacks of the prior art and achieves the objects of effective and safe operation

What is claimed is:

1. In a system for retrieving a selected one of a plurality of coded sheets, the system having a horizontal platen on which the sheets are vertically disposed in a storage position, the sheets having coded bottom edges contacting the platen, selector means provided to the platen to engage with the coded bottom edges of the sheets so that horizontal movement of only the selected sheet from said storage position to an intermediate position is possible when said selector means is actuated, biasing means to urge the sheets from said storage position towards said intermediate position, and actuating means operative to actuate said selector and biasing means, the improvement comprising:
   hook portions formed on the upper edges of the sheets; and
   an engaging member movable by said actuating means;
   said actuating means being operative to sequentially actuate said selector means and said biasing means to move only the selected sheet from said storage position to said intermediate position and thereafter move said engaging member in a combined vertical and horizontal direction to engage with the hook portion of the selected sheet and lift and move the selected sheet to a retrieval position, said engaging member being arranged to engage with the hook portion of only the selected sheet in said intermediate portion and to clear the hook portions of the other sheets during the combined vertical and horizontal movement, and said biasing means being operative to move the selected sheet in one horizontal direction parallel to the horizontal edges of the sheets, and the horizontal component of the combined vertical and horizontal direction in which said engaging member is moved by said actuating means is opposite to the one horizontal direction.

2. In a system according to claim 1 in which:
   the sheets are formed with magnetically responsive portions on vertical edges thereof and said biasing means includes a magnet movable by actuating means from a first position to a second position to magnetically attract the magnetically responsive portions of the sheets to move the selected sheet from said storage position to said intermediate position, said actuating means being further operative to move said magnet from said second position back to said first position after moving said engaging member to constitute an alignment stop for the sheets, the improvement further comprising:
   an alignment member movable, by said actuating means prior to movement of said magnet from said first position to said second position, in a direction to cause the sheets to abut against said magnet and thereby align the sheets with each other and with said selector means.

3. In a system according to claim 1 in which the coded bottom edges of the sheets are serrated, selected serrations being removed to constitute the code, said selector means including sorting bars arranged transverse to the bottom edges of the sheets and being selectively raisable by said actuating means to engaging positions between the serrations so that only the selected sheet whose bottom edge has serrations removed which correspond to the raised sorting bars may be moved by said biasing means parallel to the bottom edge by a distance of one serration.

4. In a system according to claim 1, further comprising a stop member arranged so that vertical edges of sheets moved with the selected sheet due to friction therewith when the selected sheet is moved by said engaging member will abut against said stop member.

5. In a system according to claim 1 in which said engaging member is a push bar arranged transverse to the surfaces of the sheets and movable by said actuating means parallel to the horizontal edges of the sheets.

6. In a system for retrieving a selected one of a plurality of coded sheets, the system having a horizontal platen on which the sheets are vertically disposed in a storage position, the sheets having coded bottom edges contacting the platen, selector means provided to the platen to engage with the coded bottom edges of the sheets so that horizontal movement of only the selected sheet from said storage position to an intermediate position is possible when said selector means is actuated, biasing means to urge the sheets from said storage position toward said intermediate position, and actuating means operative to actuate said selector and biasing means, the improvement comprising:
   hook portions formed on the upper edges of the sheets; and
   an engaging member movable by said actuating means;
   said actuating means being operative to sequentially actuate said selector means and said biasing means to move only the selected sheet from said storage position to said intermediate position and thereafter move said engaging member in a combined vertical and horizontal direction to engage with the hook portion of the selected sheet and lift and move the selected sheet to a retrieval position, said engaging member being guided by at least one cam surface formed on a structural portion of the system to move in said combined vertical and horizontal direction, said engaging member being arranged to engage with the hook portion of only the selected sheet in said intermediate position and to clear the hook portions of the other sheets during the combined vertical and horizontal movement.

7. In a system for retrieving a selected one of a plurality of coded sheets, the system having a horizontal platen on which the sheets are vertically disposed in a storage position, the sheets having coded bottom edges contacting the platen, selector means provided to the platen to engage with the coded bottom edges of the sheets so that horizontal movement of only the selected sheet from said storage position to an intermediate position is possible when said selector means is actuated, biasing means to urge the sheets from said storage position toward said intermediate position, and actuating means operative to actuate said selector and biasing means, the improvement comprising:
   hook portions formed on the upper edges of the sheets; and
   and engaging member movable by said actuating means;
   said actuating means being operative to sequentially actuate said selector means and said biasing means to move only the selected sheet from said storage position to said intermediate position and thereafter move said engaging member in a combined vertical and horizontal direction to engage with the hook portion of the selected sheet and lift and move the selected sheet to a retrieval position, said actuating means including at least one cam for sequentially actuating said biasing means and said engaging member, said engaging member being arranged to engage with the hook portion of only the selected sheet in said intermediate position and to clear the hook portions of the other sheets during the combined vertical and horizontal movement.

* * * * *